United States Patent
Hinnerson et al.

(10) Patent No.: US 11,645,785 B2
(45) Date of Patent: May 9, 2023

(54) METHOD AND ENCODER RELATING TO ENCODING OF PIXEL VALUES TO ACCOMPLISH LOSSLESS COMPRESSION OF A DIGITAL IMAGE

(71) Applicant: SICK IVP AB, Linköping (SE)

(72) Inventors: Martin Hinnerson, Linköping (SE); Mattias Johannesson, Linköping (SE)

(73) Assignee: SICK IVP AB, Linköping (SE)

( * ) Notice: Subject to any disclaimer, the term of this patent is extended or adjusted under 35 U.S.C. 154(b) by 267 days.

(21) Appl. No.: 16/864,338

(22) Filed: May 1, 2020

(65) Prior Publication Data
US 2020/0349741 A1 Nov. 5, 2020

(30) Foreign Application Priority Data
May 2, 2019 (EP) .................................. 19172426

(51) Int. Cl.
G06K 9/36 (2006.01)
G06T 9/00 (2006.01)

(52) U.S. Cl.
CPC ..................................... G06T 9/00 (2013.01)

(58) Field of Classification Search
CPC ......... G06T 9/004; G06T 9/00; H04N 19/103; H04N 19/11; H04N 19/14; H04N 19/182; H04N 19/436; H04N 19/593; H04N 19/88; H04N 19/91; H04N 19/93; H04N 19/13; H04N 19/176; H04N 19/42; H04N 19/44; H04N 1/413; H04N 1/4115; H04N 5/9262; H04N 9/8045; H04N 9/8082; H04N 1/417; H04N 1/4172; H04N 1/4175; H03M 7/3071
See application file for complete search history.

(56) References Cited

FOREIGN PATENT DOCUMENTS

JP 2006311055 A 11/2006
JP 2006339990 A 12/2006

OTHER PUBLICATIONS

Tsung-Han Tsai et al: "Design and Analysis of High-Throughput Lossless Image Compression Engine Using VLSI-Oriented FELICS Algorithm", IEEE Transactions on Very Large Scale Integration (VLSI) Systems, vol. 18, No. 1, Jan. 1, 2010 (Jan. 1, 2010), pp. 39-52, XP011280963.
Carpentieri B et al: "Lossless compression of continuous-tone images", Proceedings of the IEEE, vol. 88, No. 11, Nov. 1, 2000 (Nov. 1, 2000), pp. 1797-1809, XP011450788.
Wang Z et al: "Fast lossless image compression with 2D Golomb parameter adaptation based on JPEG-LS", Signal Processing Conference (EUSIPCO), 2012 Proceedings of the 20th European, IEEE, Aug. 27, 2012 (Aug. 27, 2012), pp. 1920-1924, XP032254587.

*Primary Examiner* — Duy M Dang
(74) *Attorney, Agent, or Firm* — Duane Morris LLP; Gregory M. Lefkowitz; Randall C. Pyles

(57) ABSTRACT

Encoder and method for encoding of pixel values of a digital image comprising multiple lines of pixels to accomplish lossless compression of the digital image. For each of said multiple lines the encoder obtains unencoded pixels values of the line. Further, for each of said multiple lines, the encoder determines, for each of one or more pixels of the line, which encoding to be used for encoding of the unencoded pixel value of the pixel (x) in said lossless compression of the digital image. The determination being based on how said unencoded pixel value relates to unencoded pixel values of other, closest neighboring pixels (N1, N2) of said line.

12 Claims, 7 Drawing Sheets

*Example 1:*

*Example 2:*

Output 32 bit word:

Buffer:

Buffer after shift:

METHOD AND ENCODER RELATING TO ENCODING OF PIXEL VALUES TO ACCOMPLISH LOSSLESS COMPRESSION OF A DIGITAL IMAGE

This application claims the benefit of European Patent Application No. EP 19172426.9, filed 2 May 2019, the entire contents of which are hereby incorporated by reference.

TECHNICAL FIELD

Embodiments herein concern a method and arrangements relating to encoding of pixel values of a digital image comprising multiple lines of pixels to accomplish lossless compression of the digital image.

BACKGROUND

A digital image is typically defined as an array of pixels. The number of pixels in the array is usually referred to as the resolution. Each pixel is represented by, i.e. is associated with, one or more pixel values comprising information about the image for the position of the pixel. In a grayscale image the pixel is represented by a non-negative integer value describing the intensity of that pixel. The bit-depth of an image define the range of values that a pixel can have. Grayscale images typically have a pixel depth of 8-16 bits, meaning the pixel range is [0; 2N−1], where N is the pixel depth.

Industrial vision cameras and systems for factory and logistic automation may be based on three-dimensional (3D) machine vision, where 3D-images of an object are captured. By 3D-images is referred to images that comprise also "height", or "depth", information and not, or at least not only, information, e.g. intensity and/or color, regarding pixels in only two-dimensions (2D) as in a conventional image. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may correspond to other material properties such as the scattering of the light in the imaged area or the reflection of a specific wavelength of light.

Hence, a pixel value may e.g. relate to intensity of the pixel and/or to range data and/or to material properties.

Digital data compression is the task of encoding information using fewer bits than the original representation. The goal of this is typically to reduce storage space or minimize transport bandwidth. By minimizing the redundant information in digital files, data can be compressed either lossless or lossy. Lossless, also known as non-destructive, compression is when the compression process is perfectly reversible, meaning that the compression can be reversed to achieve an exact copy of the original information. Lossy compression is when this cannot be achieved, typically because of quantization in the compression algorithm.

Lossless compression techniques is of main interest in the present disclosure.

Compression algorithms designed for images typically consist of a decorrelation step followed by entropy coding. Since normal, continuous images have a high correlation between neighboring pixels, i.e. spatial redundancy, the decorrelation step is used to minimize this redundancy, thus decreasing image entropy.

Lossless image compression techniques can be divided in two categories, prediction based and dictionary-based techniques.

There are many well developed dictionary-based compression algorithms including e.g. the so called Lempel-Ziv-Welch (LZW) algorithm, arithmetic coding algorithms and so called Huffman coding algorithms. In these, repetitive and frequently occurring patterns are assigned shorter codewords. A table of codewords is created based on the statistics of the image and then used to encode the image. The probability table is usually created by so called two pass methods where the image is scanned twice (or more) to build a statistical model on which the image can be compressed. Another approach is to use a fixed probability table which is created based on assumptions of the images the encoder will handle.

The prediction-based algorithms exploit the spatial redundancy in images by predicting a current pixel value based on neighboring, i.e. adjacent, pixels and then encoding the prediction error, i.e. a residual value, of the difference between the prediction and the actual pixel value. The encoding can be done in one pass. Prediction based algorithms are e.g. used in Joint Photographic Experts Group LS (JPEG-LS) that support lossless compression, Context-based, Adaptive, Lossless Image Codec (CALIC), Fast Efficient & Lossless Image Compression System (FELICS) and SZIP that is an implementation of extended-Rice lossless compression.

In highly automated industries like manufacturing, assembly and quality control, fast and precise sensors and measuring are necessary, e.g. as provided by camera and imaging based system. Such systems may send uncompressed image data over Gigabit Ethernet (GbE) to a host computer for further processing. The bandwidth of the Ethernet link sets a limit for the camera operation speed since images are expected or even needed at the receiver with low latency. Hardware upgrades to allow for faster Ethernet communication comes with a high cost, and cost efficient solutions that increase throughput are desirable.

Conventional digital grayscale and RGB-images as well as 3D images with range data typically have high spatial and temporal redundancy, which can be utilized for compression. Lossless compression schemes like JPEG-LS, CAL-ICS and Run Length coding (RLC), also known as Run Length Encoding (RLE), can be used to increase information density and reduce the size of image files. Hence, such solutions, and sufficiently high compression and decompression speed, could be utilized to increase throughput over a communication link, e.g. an Ethernet link, compared to what would be possible in case of only uncompressed image data.

Hence, in camera systems the image data bandwidth can be very high, and sometimes the physical transport layer such as Gigabit Ethernet limits the performance. Therefore lossless compression can increase the performance of a system. Lossless is desirable or often even needed when a camera system is being used to perform measurements.

US 2016249064 A1 discloses lossless data compression and decompression apparatus, system and method. An object is to augment the average quantity of image data to be transported in a lossless manner, such as Gigabit Ethernet connection, to increase the bandwidth thereof. A video image file for the compression comprises a plurality of line segments, each line segment having a length of M pixels and a header of H bits, and each pixel is represented by t bits. It is read, from the unencoded image file, a first number of unencoded pixel values in a first line segment having a first segment length M pixels. It is further read, from the unencoded image file, a second number of unencoded pixel values of a second line segment having a second length M. It is then determined the differences between each of the first and second unencoded pixel values. Only the differences between each of the first and second unencoded pixel values are encoded using a smallest number of bits t for a given number of bits for each pixel value in the segment, wherein t is defined as an integer between 1 and N.

SUMMARY

In view of the above an object is to provide one or more improvements or alternatives to the prior art, such as regarding encoding of pixel values of a digital image for accomplishing lossless compression and facilitating transport over a bandwidth limited communication link.

According to a first aspect of embodiments herein, the object is achieved by an encoder for encoding of pixel values of a digital image comprising multiple lines of pixels to accomplish lossless compression of the digital image. The encoder is configured to, for each of said multiple lines, obtain unencoded pixels values of the line. The encoder is configured to, for each of said multiple lines, determine, for each of one or more pixels of the line, which encoding to be used for encoding of the unencoded pixel value of the pixel in said lossless compression of the digital image. The determination being based on how said unencoded pixel value relates to unencoded pixel values of other, closest neighboring pixels of said line.

According to a second aspect of embodiments herein, the object is achieved by a method, performed by an encoder, for encoding of pixel values of a digital image comprising multiple lines of pixels to accomplish lossless compression of the digital image. The encoder obtains, for each of said multiple lines, unencoded pixels values of the line. The encoder further, for each of said multiple lines, determines, for each of one or more pixels of the line, which encoding to be used for encoding of the unencoded pixel value of the pixel in said lossless compression of the digital image. The determination being based on how said unencoded pixel value relates to unencoded pixel values of other, closest neighboring pixels in said line.

According to a third aspect of embodiments herein, the object is achieved by a computer program comprising instructions that when executed by one or more processors causes the encoder to perform the method according to the second aspect.

According to a fourth aspect of embodiments herein, the object is achieved by a carrier comprising the computer program according to the third aspect.

By determining which encoding to be used for encoding of the unencoded pixel value of the pixel in said lossless compression of the digital image based on other pixel values in the same line, e.g. of reference pixels corresponding to predictors in the same line, it is enabled fast and resource efficient hardware implementation, in particular when the digital image is a 3D image with range data. Pixel values can be encoded and decoded line independent and suitable encoding for lossless compression can be determined, e.g. selected, per pixel value and be based on the same reference pixels as the determination.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, a study of existing lossless compression techniques has been performed and how these perform with so called line scan image data and when the pixel values relate to range data. Line scan image data results when image data of an image is scanned or provided one line at a time, e.g. by camera with a sensor configured to sense and provide image data, one line of pixels at a time. A special case of line scan image is image data provided by so called "sheet of light", or laser-line, 3D triangulation. 3D machine vision systems are often based on active triangulation. In such a system there is a light source illuminating the object with a specific light pattern. It is common to use a sheet of light as the specific light pattern, e.g. produced by laser light.

Figure 1A:
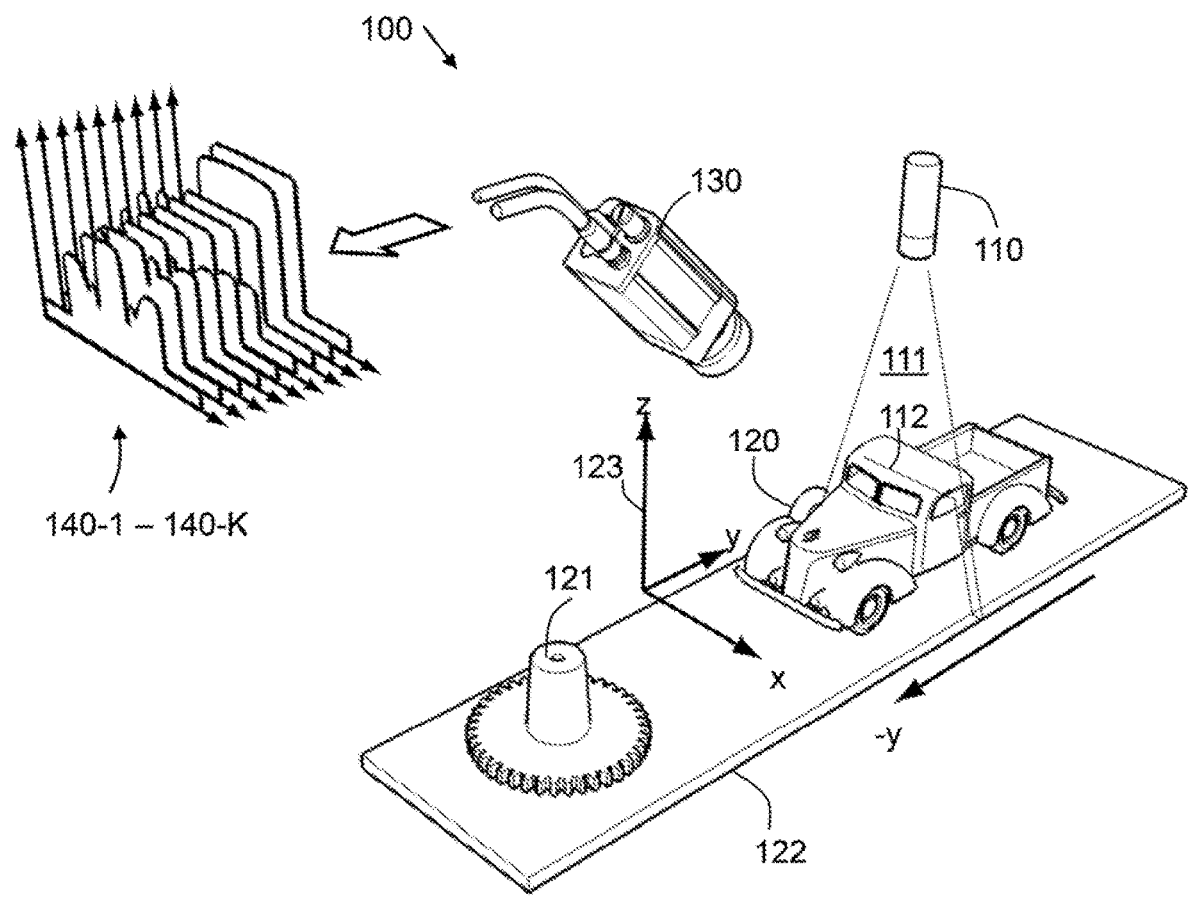
FIG. 1A schematically illustrates a triangulation based measuring system for provision of 3D images and in which embodiments herein may be applied.

FIG. 1A schematically illustrates an example of such a system, namely a measuring system 100. The system 100 may correspond to a machine vision system configured for active triangulation. The measuring system 100 comprises a light source 110, e.g. a laser, for illuminating objects to be imaged with a specific light pattern 111, in the figure exemplified and illustrated as a sheet of light. The light may, but not need to be, laser light. In the shown example, the objects are exemplified by a first object 120 in the form of a car and a second object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first object 120. The specific light pattern 111 is reflected by the object, more specifically by portions of the object at the intersection, i.e. at the light line 112 in the shown example. The measuring system 100 further comprises a camera unit 130 comprising an image sensor (not shown), which is arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera unit 130 and the image sensor, and corresponding image data may be produced and provided for further use. For example, in the shown example, the specific light pattern 111 will at the light line 112 on a portion of the car roof of the first object 120 be reflected towards the camera unit 130 and image sensor, which thereby may produce and provide image data with information about said portion of the car roof. With knowledge of the geometry of the measuring system 100, e.g. how image sensor coordinates relate to world coordinates, e.g. coordinates of a coordinate system 123, e.g. Cartesian, relevant for the object being imaged and its context, the image data may be converted to information on 3D characteristics, e.g. a 3D shape or profile of the object being imaged in a suitable format.

By moving e.g. the light source 110 and/or the object to be imaged, such as the first object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profiles 140-1-140-K of the first object 120. As indicated in the figure, a conveyor belt 122 or similar may be used to move the objects through the specific light pattern 112, with the light source 110 and the camera unit 130 typically stationary, so that all portions of each object, or at least all portions facing the light source 110, are illuminated. The information on said 3D characteristics, e.g. said 3D shape(s) or profile(s), may comprise data describing 3D characteristics in any suitable format.

As understood from the above, an image provided by the camera unit 130 and the image sensor, e.g. of the first object 120, comprises multiple lines of pixels, where each line may correspond to a scanned profile as illustrated in the figure and with range data as pixel values. The lines of pixels may be provide sequentially during a scan.

An advantage of using a configuration as in FIG. 1A is that line distortion is concentrated to one direction which simplify calculations and reduce calibration complexity. Drawbacks are that the camera views of the object is at an angle which means that the camera needs a higher depth of field and that when the object vary in height, some parts of the laser line can be blocked and thereby be invisible for the camera. Pixels in a profile where the laser-line was blocked or the intensity was below a set threshold are called missing data and will in a produced image typically appear as continuously occurring pixels with the same defined value identifying missing data, e.g. 0.

Images provided by the camera unit 130 and the image sensor are typically desirable to transfer, e.g. transmit, for further processing outside the camera unit, e.g. to a host computer or similar, and situation as discussed in the Background may occur. That is, a communication link, e.g. physical transport layer such as Gigabit Ethernet, may limit performance and compression, that typically must be lossless, before transmission may thus be used to avoid this and enable increased performance.

Figure 1B:
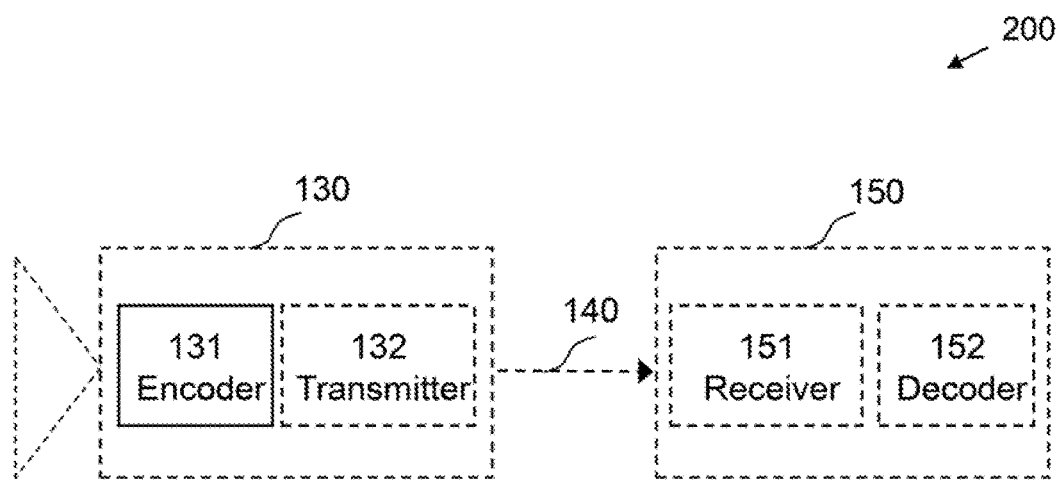
FIG. 1B schematically illustrates a system with an encoder in a camera unit and for transmission of encoded data over a communication link to a receiving unit with decoder and in which system embodiments herein may be applied.

FIG. 1B schematically illustrates a system 200 for encoding of a digital image, e.g. for lossless compression, and transmission of encoded data over a communication link 140, e.g. a Gigabit Ethernet link. Here the encoding is performed by an encoder 131, e.g. an encoding device or encoder circuitry, that may be comprised in a camera unit, e.g. a camera or image capturing apparatus, here shown as the camera unit 130, i.e. the camera unit with the encoder 131 may be the camera unit 130 in FIG. 1A. The encoded image data may correspond to image data captured by the camera unit 130, or rather the image sensor thereof, and compressed non-destructively, i.e. lossless compression. Encoded image data provided by the encoder 131, may be obtained by a transmitter 132, e.g. circuitry or module, also comprised in the camera unit 130 and that is configured to transmit the encoded image data over the communication link. The transmitter 132 may be part of an Input/Output (I/O) circuitry or module of the camera unit 130 and interfacing the communication link. A receiving unit 150, e.g. a device or apparatus, e.g. being comprised in or corresponding to a host computer, may be configured to receive the encoded image data over the communication link 140. The receiving unit 150 may comprise a receiver 151, e.g. transmitting circuitry or module, that may be part of an Input/Output (I/O) circuitry or module interfacing the communication link 140, and configured to obtain the encoded image data by receipt over the communication link 140. The shown receiving unit may also comprise a decoder 152, configured to decode, e.g. decompress, image data that has been encoded, e.g. compressed, by the encoder 131. The camera unit 130 and receiving unit 150 in practice also comprises further circuitry and/or modules, as realized by the skilled person, but that are not shown here for reasons of simplification. For example may the receiving unit 150 provide means and/or access for storage and/or further processing of decoded image data that in case of lossless compression thus may operate on the same image information as before the encoding, i.e. as provided by the camera unit 130, such as an image sensor thereof.

Pixel values of range data as mentioned above is comparable to pixel values of a regular grayscale image. The bit depth provided may e.g. be set to 8, 12 or 16-bit with a normal case e.g. being 12-bit depth, meaning the pixel values are in the range of 0 to $2^{12}-1$, i.e. 0 to 4095, and e.g. including also the value identifying missing data, e.g. 0. A pixel width of an image line may e.g. 2560 pixels when a certain camera is used.

A main difference found between the pixel values of range data of 3D images and conventional grayscale images is the existence of missing data as mentioned above.

Requirements desirable to be met by an encoder for compression of image data suitable to use with line scan data as mentioned above, comprise that it should be suitable for real time application, i.e. real time encoding of range data, that a compression ratio of at least 1.5-2 is enabled, and throughput of the encoder should exceed that of Gigabit Ethernet, i.e. >125 MB/s. The encoder is preferably implemented in hardware and it is then also desirable to keep down the amount of hardware resources needed for implementation and keep down latency in the provision of the encoded data.

The compression ratio is indicating how much the encoder is able to compress, i.e. reduce size of, a typical image, here a typical range data image as described above. Another way of describing the compression ratio is the relation between the number of bits required to represent the data before compression to the number of bits required after compression. The throughput here relates to how much unencoded input image data can be processed each second and thus result in encoded, compressed image data.

For a decoder for decoding the output of the encoder it is desirable with low computational overhead and low latency, at least sufficiently low to match the encoder well.

With the above in mind, a comprehensive study of existing compression algorithms were performed to evaluate and find suitable lossless image compression algorithms that an encoder, e.g. the encoder 131, could be based on.

Some existing algorithms were found less suitable, e.g. two-pass algorithms as described in the Background. Contextual pixel-values, algorithm parameters, and statistical models are typically needed to be stored during compression. Since the compression should be performed in real-time and typically with high frequency, raster-scan ordered algorithms were found to be preferred. Raster-scan order means that the image is processed pixel by pixel, line by line. Some algorithms divide the image into blocks, with each block being processed individually. This however would require buffering of several lines of the image before processing, resulting in larger latency and/or a large need for storing/buffering of unencoded lines of image data. This is e.g. the case for the prior art solution described in the Background, where two lines are used.

Further, since an implementation in hardware should be able to run in real time and at desirable speeds, pipeline stages should be relatively simple. Therefore algorithms that can be realized with simple logic and arithmetic operations should be preferred over other algorithms. Further, data dependencies in the pipeline should be avoided, hence dynamic models that update during compression may better be avoided.

Further, a study of entropy in a number of different range data images was performed and with different decorrelation methods applied to reduce entropy. The entropy can be used to evaluate the compressibility. The entropy of an image indicates a lower bound for how much the image can be compressed. By dividing the pixel depth with the entropy an approximate limit of the compression ratio can be achieved.

A compression method that was found promising, at least after some adaptation and modification, is the one used in FELICS.

The above resulted in development of an encoding method designed to be simple, fast and resource efficient while still being able to exploit compressible properties of range data images as described above. Embodiments herein are based upon said resulting encoding method.

The encoding method may easiest be described as based on the existing FELICS algorithm, with modifications that involves both reductions and additions. A description of FELICS can e.g. be found in P. G. Howard and J. S. Vitter, *Proceedings DCC '93: Data Compression Conference*, March 1993, "Fast and efficient lossless image compression", pages 351-360, 10.1109/DCC.1993.253114 and in T. Tsai and Y. Lee, *IEEE Transactions on Very Large Scale Integration (VLSI) Systems*, January 2010, volume 18, "Design and Analysis of High-Throughput Lossless Image Compression Engine Using VLSI-Oriented FELICS Algorithm", pages 39-52, 10.1109/TVLSI.2008.2007230, ISSN 1063-8210.

It should be noted that the existing FELICS algorithm, which in the following may be referred to as original or regular FELICS, was not a natural starting point before insights from the study explained above. Original FELICS is as such, without modifications, not very suitable. For example is original FELICS in encoding of an image using a dynamic prediction context for individual pixels which context involves pixels of multiple lines.

In short, the encoding method that embodiments herein are based upon, comprises two main stages, prediction/modeling and entropy coding, i.e. it is prediction based. The modeling stage tries to reduce the entropy, i.e. increase the information density. It is preferred in the modeling stage to use the two preceding pixel values on the same line as a context for prediction of a current pixel. A pixel value of a pixel may relate to intensity of the pixel in case of a conventional image, or to range, i.e. object height measurement, in case of a 3D image with range data as described above. The prediction error is then encoded in the coding step using either a modified, simplified variant of the Adjusted Binary Coding (ABC) as used in FELICS, which simplified variant herein is refed to as Simplified Adjusted Binary Coding (SABC), or a variant of Golomb-Rice Coding (GRC) as used in FELICS. In addition to this, the encoding method herein adaptively switch to a run length mode when the context indicate missing data. In the run length mode the coding is Run Length Coding (RLC), that also may be referred as Run Length Encoding (RLE). RLC is as such a known method and is briefly described separately below. The source coding typically output bit-strings of variable length, and therefore a data, or bit, packer is desirable. The data packer should pack incoming bit-strings into fixed length data words which can be output as a final code to e.g. be transmitted over a communication link, e.g. the communication link 140, such as a Gigabit Ethernet link. Since an image is compressed line-independent and e.g. in a line-independent scan order, the total resulting code length of each line should be output together with the compressed code. This removes data dependencies between lines and allows a decoder to operate in parallel on multiple lines.

Hence, the encoding method that embodiments herein are based upon is prediction based and uses for this a context of two preceding pixels in the same line as a pixel subject for encoding. Different encoding techniques are used based on the context. Which encoding technique to be used to provide encoding of a certain pixel value, e.g. which on one of SABC, said variant of GRC, or RLC, is determined also based on the context. This enables a simple, fast and resource efficient implementation of lossless compression of images, and in particular range data images, as described above.

Next, said two main stages of the encoding method of the present disclosure, i.e. the prediction/modeling and the encoding stages, as well as the data packer will be described in some further detail. The encoding stage will be described dived into said three encoding techniques, namely SABC, said variant of GRC and RLC.

1. The Prediction/Modeling Stage

As mentioned, pixel values are to be encoded in a line-independent scan order. Images may be scanned in a regular raster scan order but each line is to be encoded completely individual from the others. This differs from most predictive image compression techniques for images where two dimensions typically are used to calculate residuals. By encoding lines individually with local predictors from the same line, inter-line data dependencies are removed. With lines encoded individually, the prediction model should take this into account. For example should the prediction model be adjusted slightly compared to the original prediction model of FELICS. Basically, the first two cases, Case 1 and 2, from the prediction template of FELICS is instead used for all lines of the image. The first two pixels of each line is passed unencoded and the rest of the pixels use the two closest preceding pixels as the context model.

Figure 2:
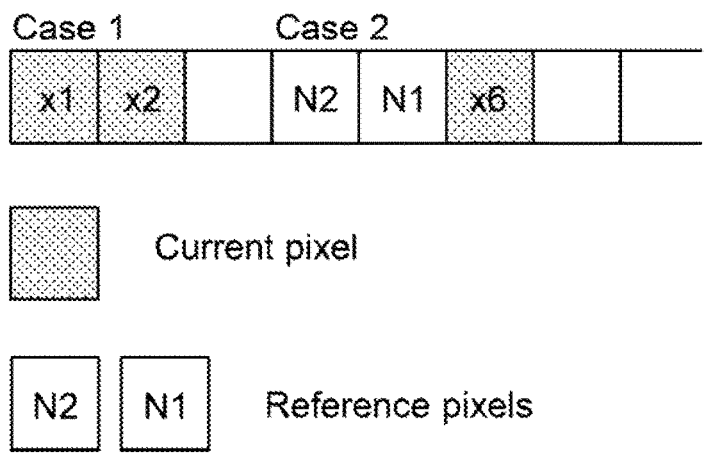
FIG. 2 schematically illustrates a prediction context for two cases.

FIG. 2 schematically illustrates the prediction context for the two cases. Case 1 relates to the two first pixels, here x1, x2, of a line and that are not subject for prediction and encoding. Case 2 is for all other pixels of the line, here shown for a pixel x6 as current pixel and with the two closest preceding pixels of the line being reference pixels N1 and N2, i.e. predictors.

The original FELICS uses an experimentally verified assumption of how the probability distribution of values depending on its predictors look like. However, since the predictors in the present method only depend on the preceding two values on the same line, the assumed probability distribution function should be adjusted.

Figure 3:
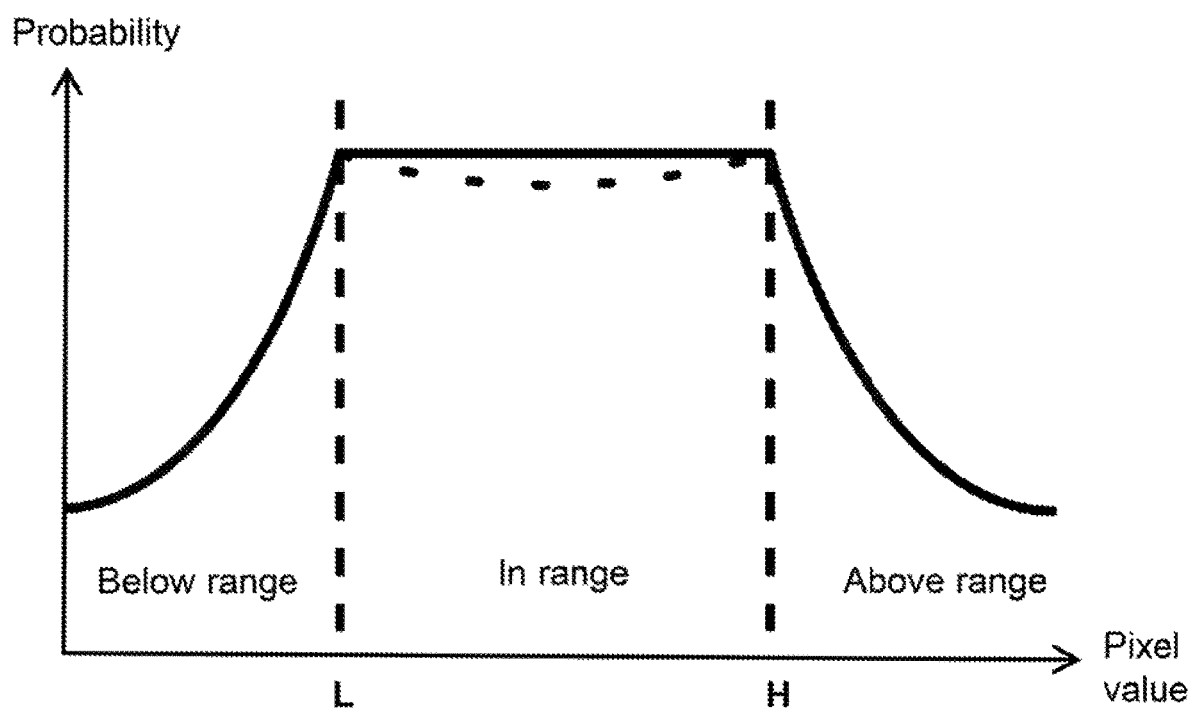
FIG. 3 schematically exemplifies an assumed probability distribution.

FIG. 3 schematically exemplifies what the adjusted assumed probability distribution may look like. L is the lowest pixel value of the two preceding pixels N1, N2 and H is the highest value. The delta, $\Delta$, is the difference between H an L. One may assume that the value of x should be closer to N1 than N2 for a continuous image, which would result in the dotted line between L and H in the figure. However, this is not exploited when the pixel value of a current pixel is in range, i.e. between L and H, and encoded using SABC, see below. The probability distribution in range can therefore be considered flat as illustrated by the solid line in the figure.

How the pixel value of a current pixel of a line is predicted is as explained below depending on its context, i.e. here how it relates to the two closest preceding pixels in the same line.

Table 1 below discloses how a residual value, $\varepsilon$, corresponding to the prediction error may be calculated depending on how the pixel value x of the current pixel relates to pixels values L and H of its predictors, i.e. here its closest neighbouring pixels N1 and N2. This relates to the situation in Case 2 explained above in connection with FIG. 2.

TABLE 1

Example of residual calculation depending on context.

| Context | Residual value, $\varepsilon$ |
|---|---|
| In range, $L \leq x \leq H$ | $x - L$ |
| Above range, $x > H$ | $x - H - 1$ |
| Below range, $x < L$ | $L - x - 1$ |

As realized, the residual calculation may correspond to Case 2 for original FELICS.

In addition to the residual calculation a method to detect flat regions, such as in cases of missing data, for adaptive run length encoding, i.e. using RLC, is introduced. The context used to determine if run mode should be used may be based on the same context as above. That is, the two closest preceding pixels in the same line together with the current pixel value is used to determine whether the encoder should enter run mode or not. If N1, N2 and x all are the same, typically a predetermined value identifying missing data, e.g. 0, the encoder should enter run mode. That is, when at least three consecutive occurring pixels has the same value, it is likely so that this is due to missing data and that also further pixels along the line will be missing data.

Figure 4:
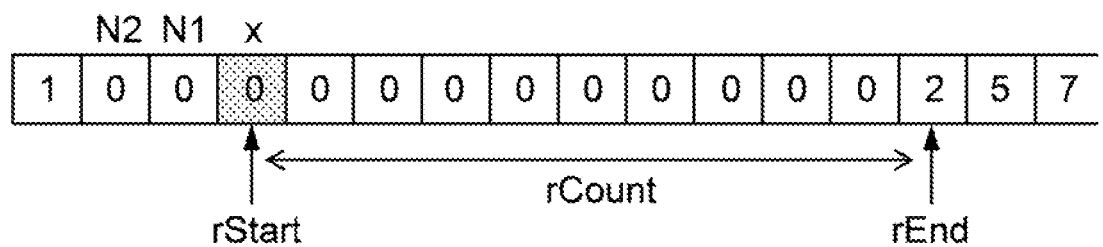
FIG. 4 schematically illustrates two examples of a Run Length Coding (RLC) principle.
Figure 4:
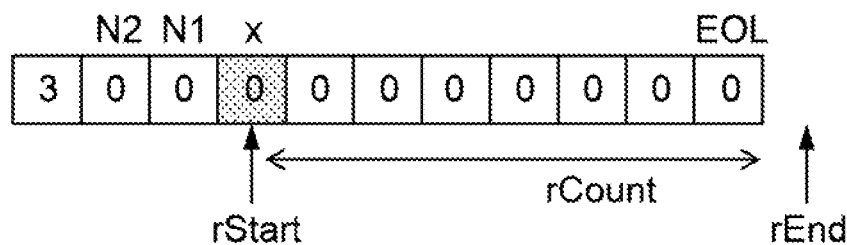

FIG. 4 schematically illustrates the run length mode and RLC coding principle indicated above in two different examples. It is shown that when run length mode is entered the current pixel x become a start pixel rStart for the run length mode and this pixel and subsequent pixels are encoded using RLC until a pixel has a different pixel value (example 1) or if End Of Line (EOL) is reached (example 2). The first pixel with different pixel value or EOL becomes an end pixel, rEnd, of the run mode. Depending on when run mode stops a number of rCount pixels are encoded using RLC. This is further discussed below.

Figure 5:
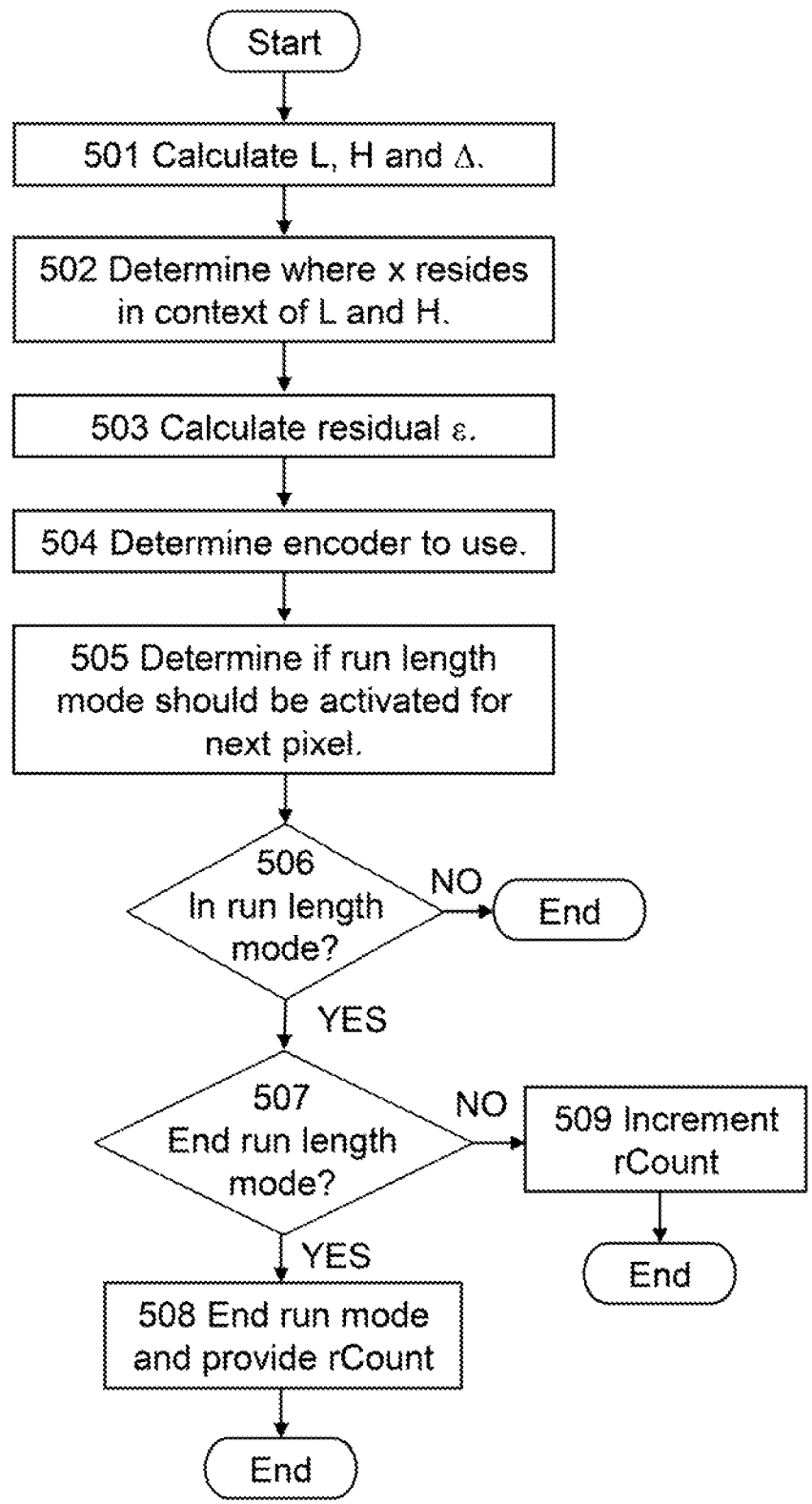
FIG. 5 is a flowchart schematically illustrating and exemplifying a modelling stage in the form of summarizing actions regarding a current pixel.

FIG. 5 is a flowchart schematically illustrating and exemplifying the modelling stage in the form of summarizing actions regarding a current pixel with a pixel value x with closest preceding pixels N1, N2 in the same line. Denotations, x, N1, N2 etc. are as explained above.

The actions below may be taken in any suitable order and/or be carried out fully or partly overlapping in time when this is possible and suitable.

In action 501 L, H and $\Delta$ thereof, i.e. H minus L, are calculated from N1 and N2.

In action 502 it is determined where x reside in the context of L and H

In action 503 the residual $\varepsilon$ is calculated.

In action 504 it is determined which encoder, i.e. encoding technique, should be used in the coding stage, e.g. which one of SABC or the variant of GRC as are further described below, should be used.

In action 505 it is determined if run mode should be activated for the next pixel.

In action 506 it is checked if in run mode or not.

If in run mode, it is in action 507 checked if run mode should end, based on the current pixel value or if end of line.

If run mode should end, in action 508 there is an exit of run mode and rCount is provided, e.g. output to be used for encoding pixel values subject for run mode, else in action 509 rCount is incremented.

The above may be performed for all pixels of a line, e.g. staring with a first pixel of the line, etc. until all performed for all pixels of the line. It may further be performed like this for all lines of the image.

2. The Encoding Stage

The purpose of the encoding stage is basically to receive the residual from the modeling stage and encode it with as few bits as possible. Consequently, the output of the encoding stage is of variable bit length.

As already mentioned, the encoding techniques to be used may be determined from SABC, a variant of GRC as in FELICS and RLC. Which source coding scheme determined to be used for a specific pixel may be encoded with an index code of either one or two bits, e.g. as exemplified in Table 2 below.

TABLE 2

Index code and encoding technique determined to be used.

| Context | Index code | Encoding technique |
|---|---|---|
| In range, $L \leq x \leq H$ | 0 | SABC |
| Above range, $x > H$ | 10 | GRC |
| Below range, $x < L$ | 11 | GRC |
| Flat (x = N1 = N2) | — | RLC |

Hence, when the pixel x reside in range the index code may be 0 and SABC be used. When the pixel reside below range or above range the index codes may be 10 and 11 respectively and the variant of GRC may be used. No index code may need to be used for the run length mode where RLC is used as further described below under 2.3 RLC.

2.1 GRC

The GRC suggested to be used for the present encoding method is, as already indicated, similar to the one used in FELICS. A main differences is that a static k-value should be used instead, meaning that the k-value should be the same for all contexts in the image. The k-value can however be adjusted in a setup stage or similar, since images will vary in different applications and the most suitable k-value for a certain application and/or situation can be selected. Additionally, a maximum code length of the unary codes should be used, since large residuals in some situations may result in a very large codeword when the k-value is not selected properly, which may be difficult due to the above. A maximum code length of the unary code is here referred to as $q_{max}$. When the index code used for GRC (see above) is of bit length 2, $q_{max}$ may be defined as $q_{max}=N-2$, where N is the bit-depth, so that the index code followed by the unary code has a maximal length equal to the bit-depth. The $q_{max}$ code need not be followed by a zero at the end like the unary codes. When $q_{max}$ is reached, instead of following the unary code with the remainder, the original pixel value with its regular binary representation may be provided instead or additionally. For example if the bit-depth is 8, the current pixel value x=100, ε=25, k=0 and a conclusion from the context is that the current pixel is below range, the codeword according to the GRC variant of the present encoding method would be:

$$\begin{cases} \text{index} = 10 \\ q_{unary} = q_{max} = 111111 \\ r_{bin} = x = 01100100 \end{cases} \Rightarrow \begin{cases} \text{codeword} = 1011111101100100 \\ \text{codeLength} = 16 \end{cases}$$

This may be compared to the code word that would result from the regular GRC used in FELICS for the same parameters:

$$\begin{cases} \text{index} = 10 \\ q_{unary} = 1111111111111111111111111110 \\ r_{bin} = 0 \end{cases} \Rightarrow$$

$$\begin{cases} \text{codeword} = 101111111111111111111111111110 \\ \text{codeLength} = 29 \end{cases}$$

2.2 SABC

The Adjusted Binary Coding (ABC) used in FELICS assumes a probability distribution that should not be valid for the present encoding method, for reasons discussed above in connection with FIG. 3, e.g. because of other predictors being used. For the present encoding method, the regular ABC in original FELICS may therefore be further simplified, resulting in the SABC. In SABC the rotational shift-operations in the regular ABC used by FELICS may be removed. The regular ABC require three procedures: parameter computation, circular rotation, and codeword generation. These operations can be translated to arithmetic operations suitable for hardware implementation. However the processing speed could be seriously limited by this. In SABC, the binary value is coded using upper_bound bits always instead of only in the edge cases where x is close to L or H. This means that in some cases, a suboptimal code using one extra bit to represent the codeword may be used, compared to the original FELICS.

It should be noted that although SABC is preferred, also ABC as in original FELICS could be used, but with some drawbacks in case of hardware implementation. With an assumed probability distribution as discussed above in connection with FIG. 3, also other binary coding techniques than SABC and regular ABC could be used for pixels in range, as should be realized by the skilled person.

In general, the type of encoding for compression of a pixel value determined based on the pixel value id is in the "in range" region or "out of range" (above or below) regions, should take into account probability distribution in respective region, and additionally also other requirements, such as regarding a hardware implementation for implementation, e.g. in order to facilitate implementation, reduce cost, accomplish lower latency, etc.

2.3 RLC

As explained above in connection with FIG. 4, the run length mode and RLC are used to more efficiently handle missing data and since the probability of longer runs of the same value is very low for pixel values other than resulting from missing data, e.g. that are 0. RLC is not used in the original FELICS.

Even very flat surfaces will have some noise and inconsistencies in the height-map, i.e. in pixel values, such as resulting from height measurements. This has experimentally proven using a range of test range data images. It was seen that for longer runs where RLC is advantageous over regular GRC, most of the runs are runs of zeroes corresponding to missing data. Runs of values other than zero are often so short that RLC is not advantageous, especially considering that the first 2 pixels of the run may still be coded not using RLC. As already indicated above in connections with FIG. 4, when run length mode is entered the number of pixels between rStart and rEnd are counted. When rEnd is reached as in example 1 of FIG. 4, the current pixel x will be encoded not using RLC but e.g. using SABC or GRC instead, and the cumulated run count, i.e. rCount, may be encoded as a regular binary value. In example 2 of FIG. 4 when end of line is reached, the encoder will exit run mode and the cumulated run count, i.e. rCount, may be encoded as a regular binary value. In case of a maximum line width of 2560 pixels, e.g. determined by a camera used, e.g. image sensor thereof, the maximum length of a encoded run is 2557 since 3 pixels are used to determine rStart. Because of this the run length may always be encoded as a binary value using $\log_2(2557)=12$ bits. Since a decoder by default may, i.e. it may be predetermined to, decode lines in a predetermined order, e.g. from left to right, it may not be needed any index bits to inform the decoder that run length mode is active, or rather that RLC will be used. The decoder can figure this out automatically by looking at the last 3 decoded pixels.

When RLC ends before end of line, e.g. as explained above in relation to FIGS. 4, N1 and N2 may both be 0 and it may continue as before run length mode was entered. Another option is to start as if was the first pixel of the line, i.e. the first two pixels after end of run length mode would then not be subject for encoding, i.e. the pixel values remain unencoded. A yet further option is to "remember", i.e. store in memory, information on the latest N1 and N2 before run length mode and that that was not part of determination to enter run length mode, such as the closest previous N1, N2 in the line that was not corresponding to "missing data".

3. The Data Packer

Since the source coder output variable length bit strings, a data packer should be used to concatenate these bit string into fixed size data words, i.e. data words of equal size. The maximal length of a codeword is two times the bit-depth as described above. If the encoder is designed to handle a bit-depth of up to 16 bits, the maximal codeword length is thus 32 bits. Therefore the data packer in this case should be designed to pack and output 32 bits word. 32-bit word size is also what typically is used in imaging systems. In order to avoid buffer overflow in the data packer, a buffer used should be at least twice the size, e.g. 64 bits wide. When a complete word of 32 bits is available, it may be output and the buffer is shifted, leaving only the pixels that were not output. This way the encoder can always output words of constant bit width. Since lines of the image should be encoded individually, there is a special case when a line ends.

Figure 6A:
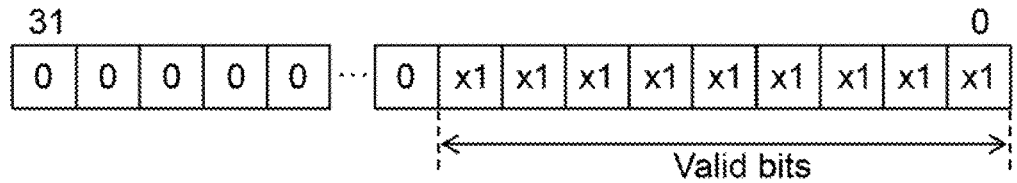
FIGS. 6A-B schematically illustrates two different situations, respectively, relating to a data packer.
Figure 6B:
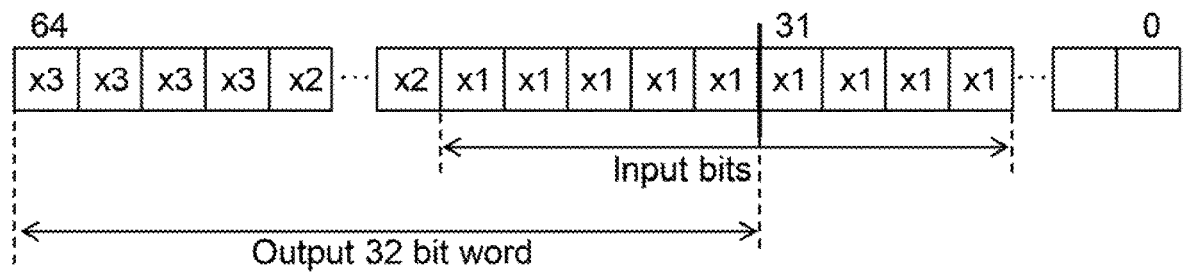
Figure 6B:
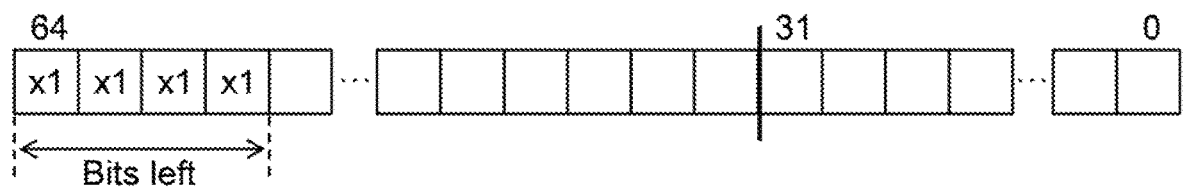

FIGS. 6A-B schematically illustrates different cases, respectively, that are relevant to consider when end of line is reached, i.e. when there are no more encoded pixel values of a line "to pack", i.e. be inserted, into a data word as above. In the shown cases x1 indicates that the bits belong to one and the same pixel x1, i.e. are part of the encoded pixel value of this pixel, which here thus is the last pixel of a line since the cases here serve to show when end of line is reached. The code length, i.e. the length of the encoded pixel value of pixel x1, is 9 bits as seen in the figure. Bits belonging to pixels that precede x1 in the line are denoted x2 and x3.

FIG. 6A shows when a complete 32 bit word is not available at end of line, i.e. the bits from the encoded pixel value of the last pixel of the line, here x1, will not completely "fill" a data word, here 32 bit. For example when a buffer contain no bits of preceding pixels of the line (as in FIG. 6B discussed below). In this case zeroes may be concatenated, i.e. inserted, at the end until a full 32 bit word is available and can be output, in this case the output 32 bit word will only contain the encoded pixel value of pixel x1. At decoding it may simply be a matter of truncating the data word to get only the valid bits for the encoded pixel value of pixel x1.

FIG. 6B shows from buffer perspective when exactly one 32 bit word is available at end of line, i.e. when the bits from the encoded pixel value of the last pixel of the line, here x1, are input and thereby will completely "fill" a data word, here said 32 bit word. Bits of encoded pixel values of preceding pixels in line, here pixels x2 and x3, were already in the buffer and then said 32 bit data word become completed with bits, here 5 bits, from the encoded pixel value of pixel x1, and the data word can be output and corresponding bits removed from the buffer. In this case output may thus be "as normal", i.e. simply output of the 32 bit word.

FIG. 6B also shows from buffer perspective when more than a 32 bit word is available, here when the buffer has shifted the remaining (4) bits from x1 after the situation in FIG. 6B. The principle of buffer shift is illustrated by thus and, as realized, the situation is then similar as in FIG. 6A and can be managed in a corresponding manner.

As understood from above, pixel values of different lines are not mixed in a data word, which is beneficial since it facilitate processing parallel decoding of lines and would be unnecessary to at this stage introduce kind of a line dependency that was avoided during the encoding.

As stated above, the encoding method may encode an image in a line-independent raster scan order. A reason for this is so that encoded lines can be decoded in parallel on a host computer, e.g. corresponding to the receiving unit 120, which will decrease total decoding time. Every time a 32 bit word is output the counter may be incremented. When a line has been encoded, the total count, e.g. integer value, reached for the specific line may be stored in a separate vector, i.e. data array, other than one containing the codes, i.e. encoded pixel values. The vector may be formed with a separate value per line of the image, e.g. a value corresponding to a number reached, i.e. accumulated count, by the counter for that line, where each such value thus will identify where the corresponding line starts among the data words containing the encoded pixels values of the image.

The count may be sent over the communication link 110, e.g. a Gigabit Ethernet link, together with the encoded image data. The information on the count, may preferably be sent on an auxiliary channel, e.g. separate from a channel used for the encoded data. In case of the communication link is a so called GenICam/GigE Vision link, the count, e.g. vector, may be sent as so called chunk data.

A further advantage, in addition to keeping line independency, of sending the count, i.e. information on where among the data words each line start, separately, is that if data is lost in the communication link, data will be lost for these lines, but it will still possible to decode the rest of the image.

A decoder of the host computer, e.g. the decoder 122 that may be implemented in software, may thereby obtain the compressed image together with information from the vector. This way the decoder can find individual lines in the obtained compressed data, e.g. a bit string of 32 bit words, and decompress them in parallel.

So far explanation has been made from perspective of the encoder. However, as should be realized, based on this, a decoder is fairly straightforward to design and implement. The stages of and actions performed by the encoder, modeling, encoding, data packing, etc., may simply be reversed. A decoder, e.g. the decoder 152, may receive a string of compressed data in data words together with e.g. said vector containing the code size of each line. After the start of a line is found, it can be decoded individually from the other lines. The decoder does not have to know the size of the code since it will always know how many pixels has been decoded "so far" and the expected line width is typically, and can in practice always be, known in beforehand.

Figure 7:
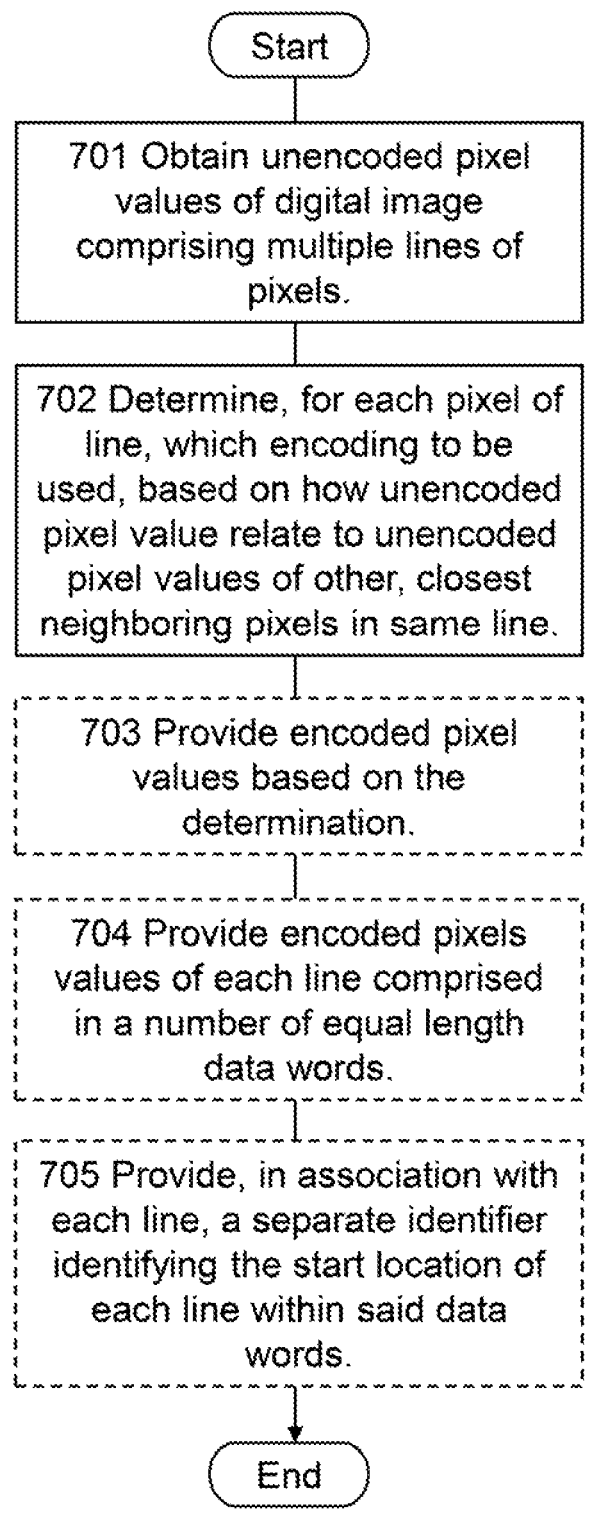
FIG. 7 is a flowchart schematically illustrating embodiments of a method according to embodiments herein.

FIG. 7 is a flowchart schematically illustrating embodiments of a method according to embodiments herein based on the encoding method discussed above.

The actions below, which may form a method, are for encoding of pixel values of a digital image comprising multiple lines of pixels, e.g. a line scanned digital image that may comprise range data as discussed above. The method, and actions thereof, may be performed by the encoder 131 that will be used as an example in the following. That is, the encoding is to accomplish lossless compression of the digital image.

The encoding should thus be for compression of the digital image, i.e. of image data thereof, and which compression should be lossless, i.e. non-destructive.

The actions below are performed for each of said multiple lines, i.e. so that the whole image thereby can be encoded and e.g. compressed. Further, the actions below may be taken in any suitable order and/or be carried out fully or partly overlapping in time when this is possible and suitable.

Action 701

The encoder 131 obtains unencoded pixels values of the line, e.g. receives hem from an image sensor of a camera, such as the camera unit 130 in FIG. 1B, where each line e.g. may correspond to a profile captured as illustrated in FIG.

1A. The pixel values may be obtained per line and e.g. one line at a time, such as at a rate determined by output of an image sensor that the encoder operate on, e.g. the image sensor of the camera unit 130.

Action 702

The encoder 131 determines, for each of one or more pixels of the line, which encoding to be used for encoding of the unencoded pixel value of the pixel, e.g. a pixel x, in said lossless compression of the digital image. The determination being based on how said unencoded pixel value relates to unencoded pixel values of other, closest neighboring pixels, e.g. pixels N1, N2, in said line. The encoding should be encoding for lossless compression. Determine which encoding to be used may be to determine which encoding technique that will be used. The determination should be independent on pixel values of the other lines, i.e. should be based on pixel values only of the same line. Also the encoding as such may be based on how said unencoded pixel value relate to the unencoded pixel values of said closest neighboring pixels.

This action may fully or partly correspond to e.g. Actions 501-505 above and may fully or partly correspond to what was described above in connection with the prediction/modelling stage and under section "1. The prediction/modeling stage".

Said closest neighboring pixels are preferably preceding pixels, e.g. the two closest preceding pixels, such as N1, N2, in a certain direction along the line. The two closest pixels preceding pixels should thus be preceding the pixel subject to the determination, e.g. pixel x corresponding to a current pixel.

A line has two directions and the certain direction may be any of them, typically a predetermined one from a first pixel to the last pixel of the line. This direction may be the direction, corresponding to an order, in which pixels values are read or being operated and may be referred as an operative direction associated with the line.

It may be determined to use RLC for encoding of pixel values of one or more subsequently occurring pixels, e.g. between rStart-sEnd as mentioned above, f said unencoded pixel value for each of said multiple subsequently occurring pixels is the same as the unencoded pixel values of said closest neighboring pixels, e.g. N1, N2, such as if they have the same predetermined value, e.g. 0, that may indicate or identify missing data.

This may fully or partly correspond to the above description regarding how RLC may be determined to be used and then applied.

The pixel values, or at least some, should be encoded based on prediction using said closest neighboring pixels and a computed residual value of the prediction, which computed residual value is based on how the unencoded pixel value relate to unencoded pixel value of at least one of said closest neighboring pixels.

This is in line with the conclusions of suitable encoding method resulting from the study discussed above. It may be noted that all of SABC, GRC, and even RLC, may be based on prediction, even using the same predictors, although RLC typically is not considered to be based on prediction. In any case, in addition to RLC, there should be encoding of pixel values based on prediction, e.g. all pixel values not corresponding to missing data.

It may be determined to use a first type of coding, e.g. a first type of lossless coding, such as SABC as described above, for encoding of said unencoded pixel value if said unencoded pixel value is between said unencoded pixel values of said closest neighboring pixels, e.g. N1, N2, and to use another, second type of coding, e.g. a second type of lossless coding, e.g. based on GRC, such as GRC modified as described above, for encoding of said unencoded pixel value if said unencoded pixel value is below or above any one of said unencoded pixel values of said closest neighboring pixels, e.g. N1, N2. Both the first and second type of coding should thus be prediction based.

This enables to exploit the probability distribution of prediction, e.g. as discussed above and illustrated in FIG. 4. The different types of coding should thus exploit the probability distribution of the prediction in the ranges that the coding in question concern. It is noted that as mentioned above, e.g. conventional ABC as used in FELICS or other binary coding may be used instead of SABC. Also other coding than GRC may be considered for the second type.

Nevertheless, as mentioned above, said second type of coding is preferably a Golomb-Rice Coding, i.e. GRC, configured to use a context independent k-value and a predetermined maximum code length. The k-value may thus be independent on said closest neighboring pixels, and e.g. be the same for all pixels of the line or for the whole digital image. The latter may be preferred for reasons already indicated above.

Action 703

The encoder 131 may then provide, based on the determination, encoded pixel values, which encoded values are said unencoded pixel values encoded by the encoder 131 and part of said lossless compression of the digital image. This may comprise that the encoder 131 encode, based on the determination, one or more of said unencoded pixel values into encoded pixel values, respectively, and/or that the encoder first encode one or more of said unencoded pixels values, fully or partly independent on the determination, and then select the encoded values based on the determination. It may be beneficial, e.g. for reasons of hardware implementation, to encode each unencoded pixel value, or at least some unencoded pixel values, using multiple types of encoding techniques first, e.g. automatically, and then provide the encoded pixel by selecting encoded values based on the determination.

This action may fully or partly correspond to what was described above in connection with the encoding stage and under section "2. The encoding stage".

Action 704

The encoder 131 may provide the encoded pixels values of each line comprised in a number of equal length data words.

That is, the predetermined length data words correspond to fixed, typically equal, length data words, each corresponding to a bit string of certain length. Equal length data words, e.g. 32 bits, may e.g. be used and the length be predetermined, e.g. based on hardware used for implementation.

The encoded pixel values of different pixels of a line may share data words among said equal length data words and encoded pixel values of different lines may be in separate data words among said equal length data words. That is, the pixel values are "packed" in fix length data words but with preserved line independent from the encoding.

The equal length data words, that thus may comprise compressed data of the digital image, may then be transmitted to a receiver, e.g. the receiver 151 of the receiving unit 150, e.g. host computer. The transmission may thus be over a communication link that may be associated with bandwidth limitations, e.g. the communication link 140.

The encoded pixel values of the data words may then be decoded by the decoder 152, and thereby decompression of the compressed digital image be accomplished.

This action may fully or partly correspond to what was described above relating to the data packer, e.g. under section "3. The data packer".

Action 705

The encoder 131 may provide, in association with each line, a respective identifier identifying the start location of the line within said equal length data words comprising said encoded pixel values. There may thus be one such identifier per line. As realized, the identifiers are separate, i.e. should be provided separately, from the equal length data words, i.e. not be comprised in the data words.

Each identifier may e.g. be a value identifying the staring position of the line it is associated with in relation to the start of the first data word, e.g. comprising the encoded pixel values of the first line of the digital image. The number of pixels per line is determined by the digital image and e.g. the image sensor used, and may therefore be considered predetermined in the context of embodiments herein. The number of pixels per line may e.g. be determined by resolution and/or settings of the image sensor used for producing the digital image.

The identifier makes it possible to find all pixels values of a certain line within the data words comprising encoded pixel values for all lines, i.e. of the whole digital image. Hence, encoded pixel values of a certain line can be found and obtained based on the identifier and knowledge about the number of pixels per line. The encoded pixel values can then be decoded into the original unencoded pixel values. This means that decoding of lines can be performed in parallel and start as soon as data word comprising the encoded pixel values of a line has been obtained, e.g. received. The identifiers may e.g. be provided in the form of values comprised in an one dimensional array, or vector as describe above, with e.g. one value per line and be provided in association with said data words, e.g. be transferred to a decoder in parallel or together with transfer of the data words, e.g. using the same or separate data channels.

In other words, the identifiers may be provided as separate values in a data structure comprising one value per line of the digital image, each value indicating start location of a respective line in relation to a reference data word, e.g. the first data word, among said equal length data words. The first data word may typically be the data word comprising the pixel values of the first pixel of the digital image.

The identifiers, e.g. in the vector, may be sent to the receiver together with, i.e. in association with, the equal length data words. The identifiers may thus be transmitted with the data words over the communication link 140 and be received by the receiver 151 and the encoded pixel values of the data words be decoded by the decoder 152, and thereby decompression of the compressed digital image be accomplished.

Also this action may fully or partly correspond to what was described above relating to the data packer, e.g. under section "3. The data packer".

Figure 8:
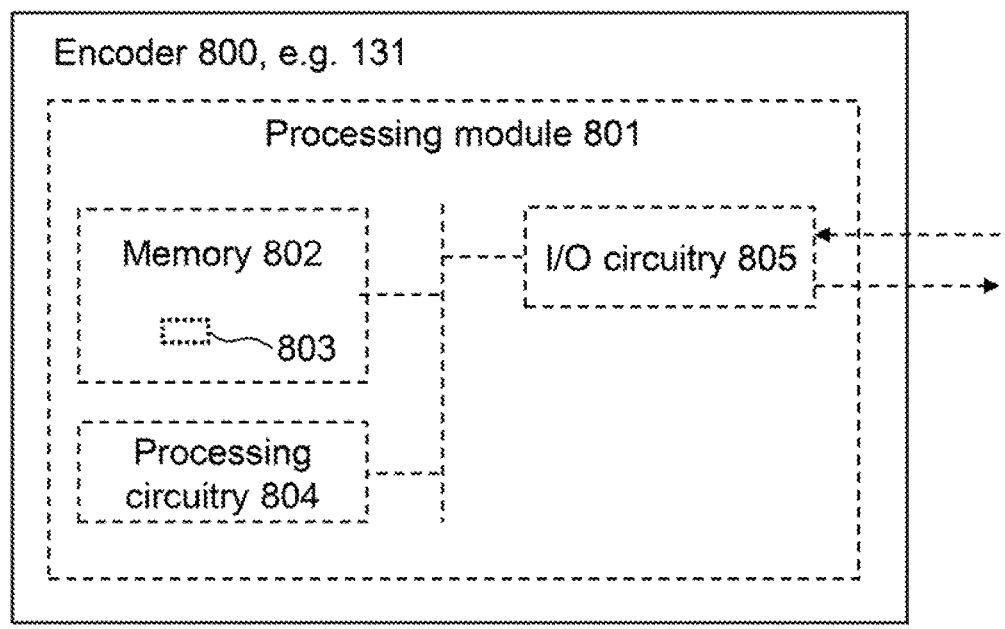
FIG. 8 is a functional block diagram for illustrating embodiments of an encoder according to embodiments herein and how it can be configured to carry out the method and actions described in relation to FIG. 7.

FIG. 8 is a schematic block diagram for illustrating embodiments of an encoder 800 that may correspond to the encoder 131. The schematic block diagram is also for illustrating embodiments of how the encoder 800, e.g. the device 131, may be configured to perform the method and actions discussed above in relation to FIG. 7.

Hence, the encoder 800 is for encoding of pixel values of said digital image comprising the multiple lines of pixels to accomplish lossless compression of the digital image.

The encoder 800 may comprise a processing module 801, such as processing means, one or more hardware modules, including e.g. one or more processing circuits, circuitry, such as processors, and/or one or more software modules for performing said method and/or actions.

The encoder 800 may further comprise memory 802 that may comprise, such as contain or store, a computer program 803. The computer program 803 comprises 'instructions' or 'code' directly or indirectly executable by the encoder 800 to perform said method and/or actions. The memory 802 may comprise one or more memory units and may further be arranged to store data, such as configurations, data and/or values, involved in or for performing functions and actions of embodiments herein.

Moreover, the encoder 800 may comprise processing circuitry 804 involved in processing and e.g. encoding data, as exemplifying hardware module(s) and may comprise or correspond to one or more processors or processing circuits. The processing module(s) 801 may comprise, e.g. 'be embodied in the form of' or 'realized by' the processing circuitry 804. In these embodiments, the memory 802 may comprise the computer program 803 executable by the processing circuitry 804, whereby the encoder 800 is operative, or configured, to perform said method and/or actions thereof.

Typically the encoder 800, e.g. the processing module(s) 801, comprises an Input/Output (I/O) module(s) 805, configured to be involved in, e.g. by performing, any communication to and/or from other units and/or devices, such as sending and/or receiving information to and/or from other devices, e.g. sending encoded pixel values, e.g. corresponding to compressed image data of the digital image, to the receiving unit 120. The I/O module(s) 805 may be exemplified by obtaining, e.g. receiving, module(s) and/or providing, e.g. sending, module(s), when applicable.

Further, in some embodiments, the encoder 800, e.g. the processing module(s) 801, comprises one or more of obtaining module(s), providing module(s), encoding modules(s), as exemplifying hardware and/or software module(s) for carrying out actions of embodiments herein. These modules may be fully or partly implemented by the processing circuitry 804.

The encoder 800, and/or the processing module(s) 801, and/or the processing circuitry 804, and/or the I/O module(s) 805, and/or the obtaining module(s) may thus be operative, or configured, to, for each of said multiple lines, obtain said unencoded pixel values of the line, as described above in connection with FIG. 7.

Further, the encoder 800, and/or the processing module(s) 801, and/or the processing circuitry 804, and/or the determining module(s) may be operative, or configured, to, for each of said multiple lines, determine, for each of said one or more pixels of the line, which encoding to be used for encoding of the unencoded pixel value of the pixel, e.g. current pixel x, in said lossless compression of the digital image, as described above in connection with FIG. 7.

Moreover, the encoder 800, and/or the processing module(s) 801, and/or the processing circuitry 804, and/or the I/O module(s) 805, and/or the providing module(s) may thus be operative, or configured, to provide, based on the determination, said encoded pixel values, as described above in connection with FIG. 7.

Also, the encoder 800, and/or the processing module(s) 801, and/or the processing circuitry 804, and/or the I/O module(s) 805, and/or the providing module(s) may thus be operative, or configured, to provide the encoded pixels values of each line comprised in said number of equal length data words, as described above in connection with FIG. 7.

Furthermore, the encoder 800, and/or the processing module(s) 801, and/or the processing circuitry 804, and/or the I/O module(s) 805, and/or the providing module(s) may thus be operative, or configured, to provide, in association with each line, said respective identifier identifying the start location of the line within said equal length data words, as described above in connection with FIG. 7.

Figure 9:
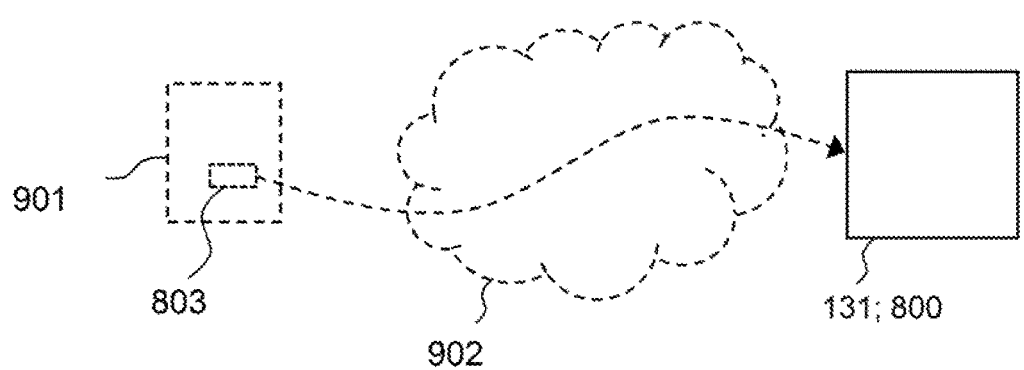
FIG. 9 is a schematic drawing illustrating embodiments relating to a computer program, and carriers thereof, to cause the encoder to perform the method and actions described in relation to FIG. 7.

FIG. 9 is a schematic drawing illustrating some embodiments relating to computer program and carriers thereof to cause said encoder 800 discussed above to perform said method and actions. The computer program may be the computer program 803 and comprises instructions that when executed by the processing circuitry 804 and/or the processing module(s) 801, cause the encoder 800 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 901 as schematically illustrated in the figure. The computer program 803 may thus be stored on the computer readable storage medium 901. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 901 may be used for storing data accessible over a computer network 902, e.g. the Internet or a Local Area Network (LAN). The computer program 803 may furthermore be provided as pure computer program(s) or comprised in a file or files. The file or files may be stored on the computer readable storage medium 901 and e.g. available through download e.g. over the computer network 902 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuitry 804. The file or files may also or alternatively be for intermediate download and compilation involving the same or another processor(s) to make them executable before further download and execution causing said encoder 800 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. An encoder for encoding of pixel values of a digital image comprising multiple lines of pixels to accomplish lossless compression of the digital image, wherein the encoder is configured to, for each of said multiple lines:
    obtain unencoded pixels values of the line; and
    determine, for each of one or more pixels of the line, which encoding to be used for encoding of the unencoded pixel value of the pixel (x) in said lossless compression of the digital image, said determination being based on how said unencoded pixel value relates to unencoded pixel values of other, closest neighboring pixels (N1, N2) of said line, which closest neighboring pixels (N1, N2) are the two closest preceding pixels (N1, N2) in a certain direction along the line.

2. The encoder as claimed in claim 1, wherein it is determined to use Run Length Coding, RLC, is used for encoding of pixel values of one or more subsequently occurring pixels of said line, if said unencoded pixel value for each of said one or more subsequently occurring pixels is the same as the unencoded pixel values of said closest neighboring pixels (N1, N2).

3. The encoder as claimed in claim 1, wherein at least some pixel values are encoded based on prediction using said closest neighboring pixels (N1, N2) and a computed residual value (ε) of the prediction, which computed residual value (ε) is based on how the unencoded pixel value relate to unencoded pixel value of at least one of said closest neighboring pixels.

4. The encoder as claimed in claim 1, wherein it is determined to use a first type of coding for encoding of said unencoded pixel value if said unencoded pixel value is between said unencoded pixel values of said closest neighboring pixels (N1, N2), and to use another, second type of coding for encoding of said unencoded pixel value if said unencoded pixel value is below or above any one of said unencoded pixel values of said closest neighboring pixels (N1, N2).

5. The encoder as claimed in claim 4, wherein said second type of coding is a Golomb-Rice coding configured to use a context independent k-value and a predetermined maximum code length.

6. The encoder as claimed in claim 1, wherein the encoder (131; 800) is further configured to:
provide, based on the determination, encoded pixel values, which encoded pixel values are said unencoded pixel values encoded by the encoder and part of said lossless compression of the digital image.

7. The encoder as claimed in claim 6, wherein the encoder is further configured to:
provide the encoded pixels values of each line comprised in a number of equal length data words.

8. The encoder as claimed in claim 7, wherein the encoded pixel values of different pixels of a line share data words among said equal length data words and encoded pixel values of different lines are in separate data words among said equal length data words.

9. The encoder as claimed claim 7, wherein the encoder is further configured to:
provide, in association with each line, a respective identifier identifying the start location of the line within said equal length data words comprising said encoded pixel values.

10. The encoder as claimed in claim 9, wherein the identifiers are provided as separate values in a data structure comprising one value per line of the digital image, each value indicating start location of a respective line in relation to a reference data word among said equal length data words.

11. A method, performed by an encoder, for encoding of pixel values of a digital image comprising multiple lines of pixels to accomplish lossless compression of the digital image, wherein the method comprises, for each of said multiple lines:
obtaining unencoded pixels values of the line; and
determining, for each of one or more pixels of the line, which encoding to be used for encoding of the unencoded pixel value of the pixel (x) in said lossless compression of the digital image, said determination being based on how said unencoded pixel value relates to unencoded pixel values of other, closest neighboring pixels (N1, N2) of said line, which closest neighboring pixels (N1, N2) are the two closest preceding pixels (N1, N2) in a certain direction along the line.

12. A computer program recorded on non-transitory computer readable medium comprising instructions that when executed by the encoder causes the encoder to perform the method according to claim 11.

* * * * *